3,473,898
PREPARATION OF NITROSYLIRON HALIDES
Perry L. Maxfield, Bartlesville, Okla., assignor to Phillips Petroleum Company, a corporation of Delaware
No Drawing. Filed Aug. 15, 1966, Ser. No. 572,179
Int. Cl. C01b 21/52
U.S. Cl. 23—356                        6 Claims

ABSTRACT OF THE DISCLOSURE

Nitrosyliron halides are prepared by the reaction of either the salts or esters of nitrosyliron containing iron compounds with a halogen such as chlorine, bromine or iodine, which are useful as starting materials in the preparation of certain iron-tin complexes employed as catalysts in the dimerization of olefins.

---

This invention relates to nitrosyliron halides. In one aspect nitrosyliron halides are prepared from an iron salt containing nitrosyl radicals. In another aspect nitrosyl radical containing iron salts are contacted with halogen in a solvent medium to produce nitrosyliron halides. In yet another aspect of this invention nitrosyliron halides are prepared by reacting a nitrosyl radical containing iron salt with elemental halogen in the absence of water.

Nitrosyliron halides having the formula $[Fe(NO)_2X]_2$ are known to be useful starting materials in the preparation of certain iron-tin complexes employed as catalysts in the dimerization of olefins and particularly in the preparation of 4-vinylcyclohexene from 1,3-butadiene. These nitrosyliron halides have been prepared by contacting a ferrous halide with nitric oxide under reducing conditions as disclosed in copending application Ser. No. 518,818.

I have now found that these nitrosyliron compounds can be prepared by another method which is simpler and more expedient in some respects in that it does not necessitate the use of the relatively unstable nitric oxide. This advantage is obtained by using starting materials which contain nitrosyl radicals.

It is, therefore, one object of this invention to provide a method for the production of nitrosyliron halides. It is another object of this invention to produce nitrosyliron halides by a simplified method not requiring the use of nitric oxide. It is yet another object of this invention to provide a method for producing nitrosyliron halides of sufficient purity for application in the preparation of catalysts.

In accordance with one embodiment of this invention nitrosyliron halides having the general formula

are prepared from nitrosyl radical containing iron salts and halogen in accordance with the following reaction

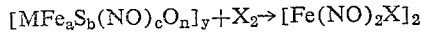

wherein M is a monovalent radical such as any one of the alkali metals, ammonium ions, or aliphatic hydrocarbon radicals, $a$ is an integer of from 1 to 4, $b$ is an integer of from 1 to 3, and $c$ is an integer of from 2 to 7, depending on the valence of iron, $n$ is 0 or 3 and when $n$ is 3 then $b$ is 2, $y$ is 1 or 2, and X is a halogen such as chlorine, bromine, or iodine.

These starting materials are either the salts or esters of nitrosyliron containing iron compounds such as, for example, an alkali metal heptanitrosyltrithiotetraferrate, potassium dinitrosylthioferrate, ethyl dinitrosylthioferrate, alkali metal dinitrosylthiosulfatoferrates, etc. The preparation of these starting materials is described in detail in the "Handbook of Preparative Inorganic Chemistry," George Brauer, ed., Academic Press, N.Y., 1965, vol. II, pages 1763 etc.

In the presently preferred embodiment of this invention, the iron salts are contacted with chlorine, bromine or iodine in a solvent medium which will dissolve both the iron salt and the halogen.

The reaction should be conducted in the essential absence of air and water by which procedure yields as high as 98 percent can be achieved. For example, the starting materials can be dried over tridecylaluminum, phosphorous pentoxide, etc.

A wide range of temperatures can be utilized in this method of preparation. Suitable temperatures are, for example, within a range of from about 50 to about 90° F. although it is generally preferred to maintain reaction temperature below about 75° F.

Since the primary purpose of the solvent in this method of preparation is to expedite contacting of the reactant materials a wide variety of solvents can be employed with their only essential features being that they are solvents for the reactants and that they are substantially inert in this particular system. Suitable solvents are, for example, tetrahydrofuran, carbon tetrachloride, benzene, toluene, chloroform, and ethers having from about 4 to about 16 carbon atoms such as, for example, diethyl ether, dibutyl ether, etc.

EXAMPLE 1

Roussin's Black Salt, $KFe_4S_3(NO)_7$, was prepared by the interaction of $KNO_2$, $FeSO_4$ and $NaSH$ in water as described in "Handbook of Preparative Inorganic Chemistry." The recovered salt was carefully dried over tridecylaluminum. To 15 ml. tetrahydrofuran was added 0.45 millimole Roussin's Black Salt ($KFe_4S_3(NO)_7$ and 0.45 millimole iodine in a flask flushed with nitrogen to remove oxygen. After the chemicals had dissolved the solvent was vacuum distilled (5 mm. Hg pressure) and the solid residue was sublimed at 80–130° C. and 0.05 mm. Hg pressure. The product was in the form of dark, red-brown crystals and weighed 0.21 g. (0.043 millimole). This corresponds to a yield of 96 percent $[Fe(NO)_2I]_2$, based on iron in starting material, $\mu,\mu'$-diiodotetranitrosyldiiron. An IR spectrum of the compound showed the presence of nitric oxide at 5.6–5.8$\mu$.

Starting compounds which may be treated directly with halogen to form the desired diiron complex are:

(1) Roussin's black salts, $KFE_4S_3(NO)_7$ (Potassium heptanitrosyltrithiotetraferrate)
(2) Roussin's red salts, $K[(NO)_2FeS]$ (Potassium dinitrosylthioferrate)
(3) The ester as, $[(NO)_2FeSC_2H_5]_2$ (ethyl dinitrosylthioferrate)
(4) $K[(NO)_2FeS_2O_3]$ (Potassium dinitrosylthiosulfatoferrate)

Numerous other starting materials are suitable reagents for preparation of the nitrosyliron halides by the method of this invention. For example, the sodium salts such as sodium heptanitrosyltrithiotetraferrate, ammonium salts such as ammonium dintrosylthiosulfatoferrate, and esters having hydrocarbon groups of from 1 to about 6 carbon atoms such as methyl and butyl dinitrosylthioferrates are readily converted in the presence of halogen to the desired nitrosyliron halides.

Reaction times within a range of from about 1 to about 30 minutes are suitable to achieve the desired conversions although 10 minutes is usually satisfactory. Following completion of the reaction, it is desirable to remove the solvent from the precipitated nitrosyliron halides by distillation under vacuum, e.g., 5 mm. Hg pressure and at a temperature not above about 120° F.

Although numerous techniques of product recovery are satisfactory for obtaining a purified nitrosyliron halides following completion of the reaction it is generally desirable to follow the recovery procedure set out in the example where very high purity is desired.

Numerous variations and modifications of the concept of this invention will be apparent to one skilled in the art in view of the foregoing disclosure and the appended claims to this invention, the essence of which is that there is provided a method for producing nitrosyliron halides by reacting nitrosyl containing iron salts with chlorine, bromine, or iodine.

I claim:

1. A method of producing nitrosyliron halides having the general formula $[Fe(NO)_2X]_2$ wherein X is a halogen selected from chlorine, bromine and iodine, comprising reacting under reaction conditions a compound of the general formula:

$$[M\ Fe_aS_b(NO)_cO_n]_y$$

with a halogen selected from the group consisting of chlorine, bromine, and iodine wherein M is selected from the group consisting of alkali metals, $NH_4+$ and aliphatic hydrocarbon radicals having from about 1 to about 6 carbon atoms; $a$ is an integer of from 1 to 4, $b$ is an integer of from 1 to 3, and $c$ is an integer of from 2 to 7, $n$ is zero or 3 and $y$ is 1 or 2 and when $n$ is 3, then $b$ is 2.

2. A method of claim 1 wherein said compound is selected from the group consisting of potassium heptanitrosyltrithiotetraferrate, potassium dinitrosylthioferrate, and potassium dinitrosylthiosulfatoferrate and said reacting is effected in the presence of an inert solvent in which said compound and halogen are soluble.

3. A method according to claim 1 wherein said reacting is effected in the essential absence of air and water so as to produce a high yield of nitrosyliron halide.

4. The method of claim 1 wherein said compound and said halogen are reacted in a solvent selected from the group consisting of tetrahydrofuran, benzene, carbon tetrachloride, toluene, chloroform and ethers having from about 4 to about 16 carbon atoms at a temperature within the range of from about 50 to about 90° F.

5. The method of claim 1 wherein said compound is potassium heptanitrisyltrithiotetraferrate, said halogen is elemental iodine, said halogen being reacted with said compound in a tetrahydrofuran solvent at temperature of about 75° F.

6. A method according to claim 4 wherein upon completion of the reaction the solvent is vacuum distilled at a reduced pressure and at an elevated temperature not above about 120° F. to remove the solvent from the nitrosyliron halide product.

References Cited

Pascal: Masson et al., vol. XVIII (1959), p. 408, Nouveaux Traité De Chimie Minérale, p. 32 C.2.

Hieber et al.: Z. f. an. u. All Chem. 240, 241 (1939).

OSCAR B. VERTIZ, Primary Examiner

HOKE S. MILLER, Assistant Examiner

U.S. Cl. X.R.

23—50